United States Patent [19]

Jakobsen et al.

[11] Patent Number: 4,530,811
[45] Date of Patent: * Jul. 23, 1985

[54] PROCESS FOR THE MANUFACTURE OF A BLANK FOR A CONTAINER

[75] Inventors: Kjell M. Jakobsen, Skanör; Claes T. Nilsson, Loddeköpinge, both of Sweden

[73] Assignee: PLM Aktiebolag, Malmo, Sweden

[*] Notice: The portion of the term of this patent subsequent to Apr. 19, 2000 has been disclaimed.

[21] Appl. No.: 452,628

[22] Filed: Dec. 23, 1982

Related U.S. Application Data

[62] Division of Ser. No. 154,887, May 30, 1980, Pat. No. 4,374,878.

[30] Foreign Application Priority Data

Jun. 11, 1979 [SE] Sweden ............................... 7905045

[51] Int. Cl.³ ...................... B29C 17/07; B29C 17/00
[52] U.S. Cl. .................................... 264/521; 264/532; 264/533; 264/291
[58] Field of Search ............... 264/521, 532, 533, 291; 425/525, 526, 529, 392, 393

[56] References Cited

U.S. PATENT DOCUMENTS

| 4,108,937 | 8/1978 | Martineu et al. | 264/535 X |
| 4,297,306 | 10/1981 | Yoshino et al. | 264/521 X |
| 4,380,525 | 4/1983 | Jacobsen et al. | 264/532 X |
| 4,397,808 | 8/1983 | Yoshino et al. | 264/532 X |
| 4,405,546 | 9/1983 | Jacobsen et al. | 264/532 X |

Primary Examiner—Jan Silbaugh
Attorney, Agent, or Firm—Roberts, Spiecens and Cohen

[57] ABSTRACT

A process of producing a tubular pre-moulding of a thermoplastic material, suitable for subsequent shaping to form containers by a rolling process. The material in a part of a tube is axially oriented as a result of reducing the wall thickness by applying an external pressure which causes the material to flow. The oriented material is moulded by a blow-moulding process into future mouth parts and parts of adjacent neck sections, preferably from two blank parts, joined to one another, of pre-mouldings, the blank parts in the transition between the two mouth parts being severed in order to form two separate blank parts, so that, after closing one end and, if necessary, reworking in order to obtain the requisite closing faces at the other end, the two blank parts each form a tubular pre-moulding.

14 Claims, 13 Drawing Figures

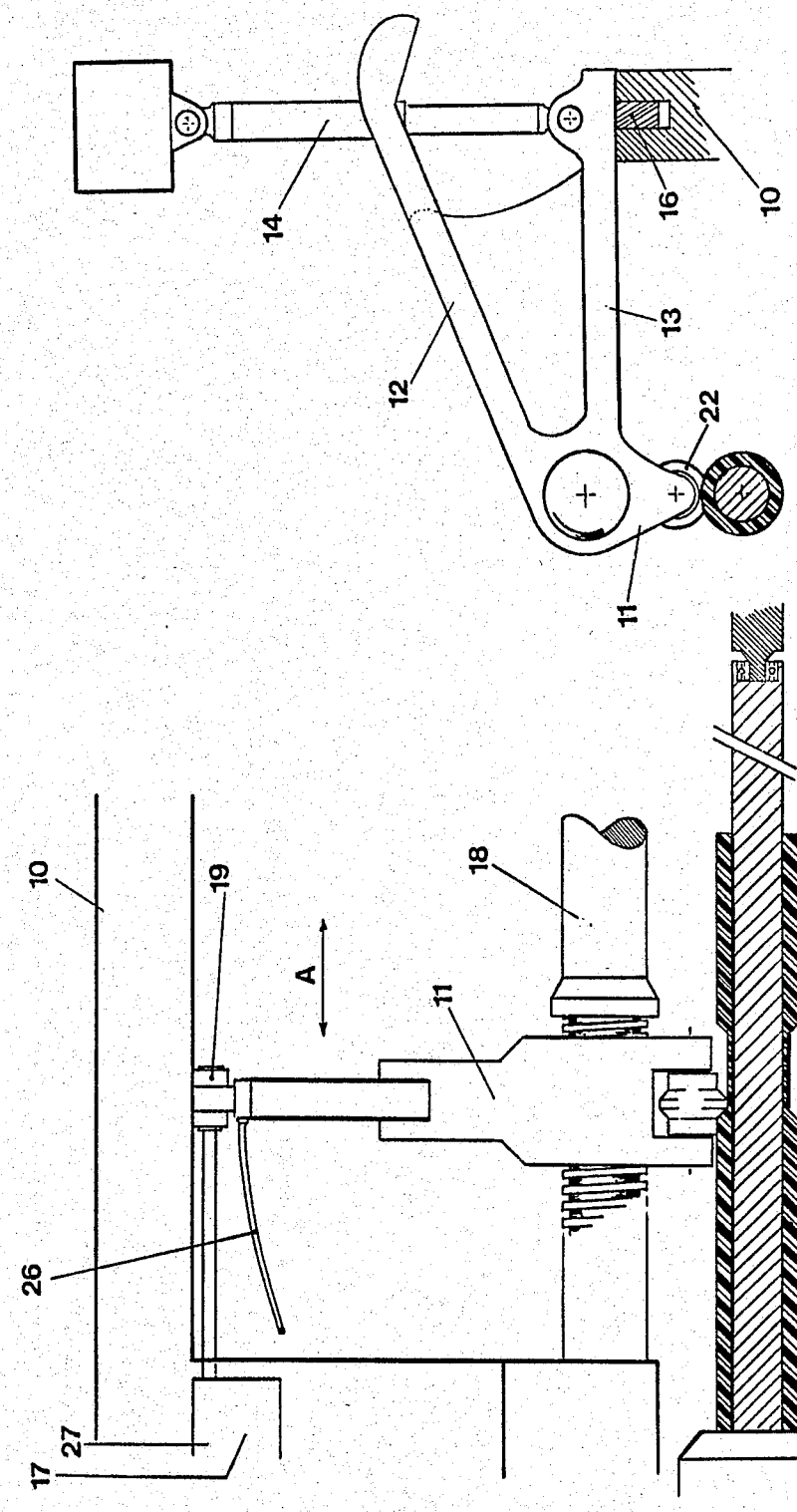

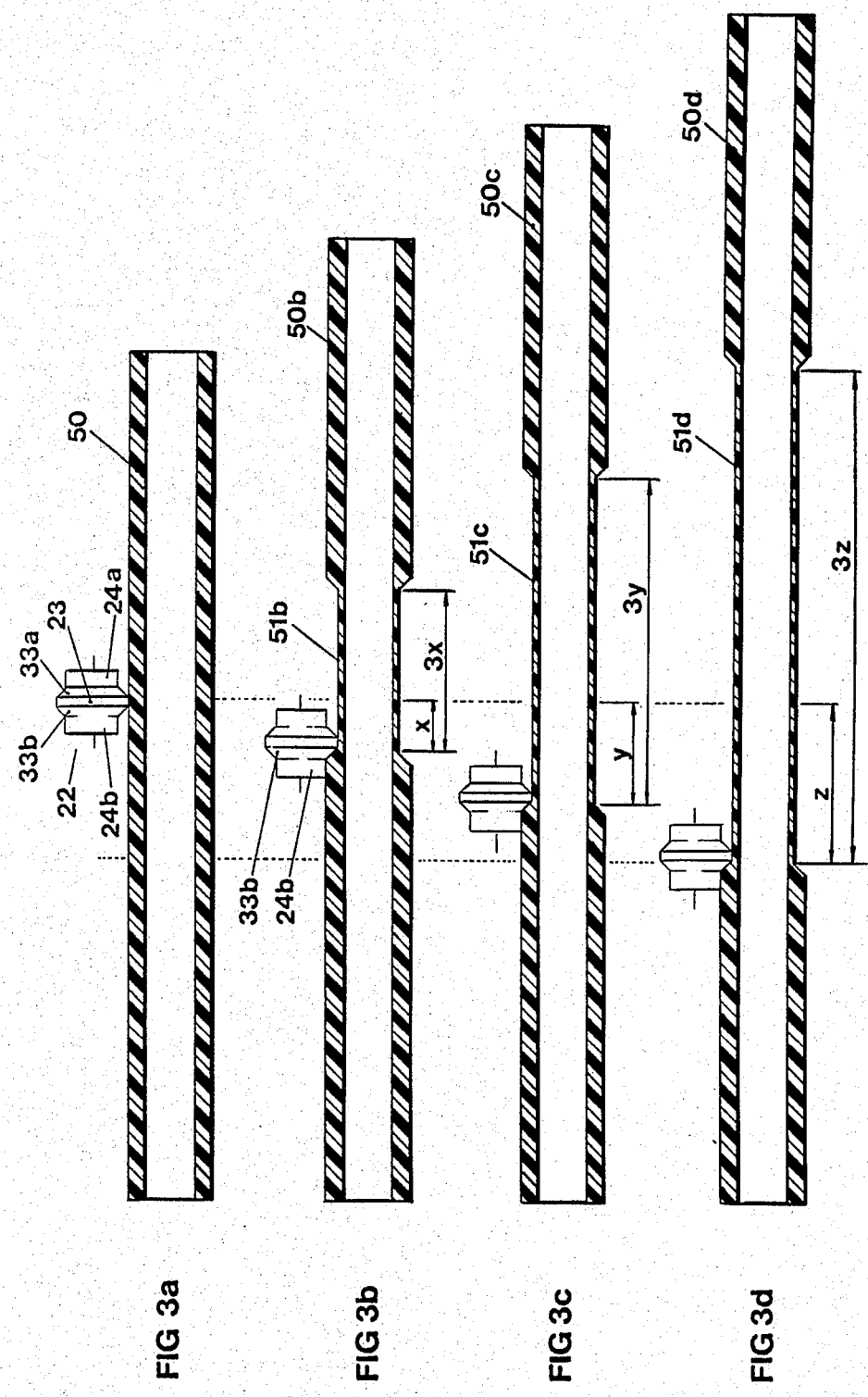

PROCESS FOR THE MANUFACTURE OF A BLANK FOR A CONTAINER

This application is a division of application Ser. No. 154,887, filed May 30, 1980, now U.S. Pat. No. 4,374,878.

FIELD OF THE INVENTION

The present invention relates to a method of manufacture of tubular preform or pre-moulding of a thermoplastic material, suitable for subsequent shaping to form containers by a rolling process. The material in a part of a tube is axially oriented as a result of reducing the wall thickness by applying an external pressure which causes the material to flow. The oriented material is moulded by a blow-moulding process into future mouth parts and parts of adjacent neck sections, preferably from two blank parts, joined to one another, of pre-mouldings, the blank parts in the transition between the two mouth parts being severed in order to form two separate blank parts, so that, after closing one end and, if necessary, reworking in order to obtain the requisite closing faces at the other end, the two blank parts each form a tubular pre-moulding.

BACKGROUND OF THE PRIOR ART

In a production process used for the manufacture of containers from a thermoplastic, blanks for containers are produced from severed parts of extruded long tubes consisting of an amorphous thermoplastic, these blanks normally being called preforms or pre-mouldings. At one end, the severed pieces are shaped in such a way that they form the future mouth part of the container, whilst they are closed at the opposite end.

The present invention eliminates certain disadvantages connected with the production process indicated above, in accordance with the known technology.

The invention is suitable especially for the manufacture of containers from a thermoplastic of the polyester or polyamide type. Examples of such materials are polyethylene terephthalate, polyhexamethylene-adipamide, polycaprolactam, polyhexamethylene-sebacamide, polyethylene 2,6- and 1,5-naphthalate, polytetramethylene 1,2-dihydroxybenzoate and copolymers of ethylene terephthalate, ethylene isophthalate and similar polymers. The description of the invention below relates mainly to polyethylene terephthalate, called PET in the further text, but the invention is not restricted only to the use of either this material or one of the other materials already mentioned; instead, it is also applicable to many other thermoplastics.

For a better understanding of the existing problem and of the invention, several characteristic properties of the polyester polyethylene terephthalate are described below. From the literature, for example Properties of Polymers, by D. W. van Krevelen, Elsevier Scientific Publishing Company, 1976, it is known that the properties of the material change when amorphous polyethylene terephthalate is oriented. Some of these changes are shown in the diagrams, FIGS. 14.3 and 14.4 on pages 317 and 319 in the book "Properties of Polymers". The symbols used in the discussion below correspond to the symbols in the said book.

PET, like many other thermoplastics, can be oriented by stretching the material. Normally this stretching takes place at a temperature above the glass transition temperature Tg of the material. The strength properties of the material are improved by orienting. The literature shows that, in the case of the thermoplastic PET, an increase in the stretching ratio $\Lambda$, that is to say the ratio of the length of the stretched material to the length of the unstretched material, also leads to an increase in the improvement of the material properties. When the stretching ratio $\Lambda$ is increased from about 2 to a little more than 3, particularly large changes in the material properties are obtained. The strength in the direction of orientation is here markedly improved, whilst at the same time the density $\rho$ and likewise the crystallinity Xc rises and the glass transition temperature Tg is raised. It can be seen from the diagram on page 317 that, after stretching, with $\Lambda$ assuming the value of 3.1, the material withstands a force per unit area, which corresponds to $\sigma=10$, coupled with a very small elongation, whilst the elongation at $\Lambda=2.8$ is substantially larger. In the further text, the term "step" is sometimes used to designate orienting which is obtained by stretching, or a reduction in thickness by about 3 times, and which leads to the marked improvements of the material properties, indicated above.

The diagrams referred to above show changes which are obtained on mono-axial orientation of the material. In biaxial orientation, similar effects are obtained in both directions of orientation. Orientation is carried out by successive stretchings.

Improved material properties, corresponding to those which are obtained by the "step" defined above, are also obtained if an amorphous material is stretched until it flows and, before flowing, the material is at a temperature which is below the glass transition temperature Tg. In a rod being drawn, a reduction of the diameter of about 3 times results in the flow zone. On drawing, the flow zone is continuously displaced into the amorphous material, whilst at the same time the material, which has already undergone the state of flowing, resists the tensile forces of the test rod without an additional permanent stretching.

Furthermore, it has been found, surprisingly, that an improvement of the material properties, obtained in the "step", is also achieved even if the material is caused to flow by means of pressure and the pressure-generating element at the same time reduces the thickness of the material to about ⅓ of the previous thickness (this applies to PET), the reduction in the thickness leading to an elongation of the section of material by a factor of about 3 in a direction which is at right angles to the direction in which the reduction in thickness takes place.

For bottles, defined external diameters of the mouth with the associated thread are standardized and, in the technology known at present when using the moulding process described as an introduction, this determines the greatest diameter which is permissible in the blow-moulded container body. The reasons for this are explained in more detail in the following text. In order to obtain an amorphous starting material for the pieces of tube, which are to be shaped into pre-mouldings, the material must be cooled rapidly to below the glass transition temperature Tg after extruding—in the case of extruded tubes from which the pieces of tube are severed. In the case of excessive wall thickness, the material does not possess adequate heat conductivity to enable the central sections of the wall to be cooled as rapidly as required, so that the material located in the centre becomes crystalline and opaque. For this reason, viewed theoretically, the largest possible wall thickness of the extruded tubes is less than 9 mm In practice, however, wall thicknesses of less than 4 mm are used as a rule. In fact, in blow-moulding of a pre-moulding having wall material of excessive thickness, problems arise due to the cooling of the material during the actual blow-moulding step and before the material reaches the wall of the mould. The blow-moulded container is no longer clear as glass and, instead, contains opaque white sections. In blow-moulding, in order to obtain containers having the requisite resistance against stresses and penetration of the container wall, the wall thickness of the finished container must not fall below a defined value. Moreover, a reduction of the external diameter of the tube during the shaping of the mouth part of the pre-moulding is not possible in accordance with known technology. The result is that the desired mouth diameter of the blow-moulded container is decisive for the diameter of the pre-moulding and thus for the maximum diameter of the blow-moulded container body. If bottles of large capacity are required, these bottles are extended, according to known technology, in the axial direction after they have reached the maximum possible diameter. In addition to the disadvantages of a certain instability, the extension represents an unsatisfactory utilization of the quantity of material in the container body since the requisite quantity of material per unit volume of storage capacity is greater than would be necessary if both the diameter and the length of the container body were adapted to the actual volume required. Moreover, the unnecessarily large surface of the container leads to a corresponding increase in the overall penetration of carbon dioxide during the storage of beverages containing carbonic acid.

To utilize the material properties of the material in the best way, it is desirable that the diameter of those parts of the pre-moulding which, after the blow-moulding step, represent the actual container body, is given a value which has the result that the material in the blow-moulded container body assumes the desired orientation. In containers of PET it is desirable that the material, in conjunction with blow-moulding, is biaxially stretched in such a way that the product of the stretchings is about 9.

The above shows that, according to known technology, the quantity of material in the mouth part is not determined by the calculated stresses but by the maximum diameter of the container body. As a rule, this leads to a considerable excess of material in the mouth part. For example, in a PET bottle of 1 liter capacity, the mouth part can, according to known technology, contain up to 25–30% of the total quantity of material. Disregarding the unpleasant appearance of the oversizing of the mouth part, this fact also results in a waste of material, which is of importance in the mass production of articles.

In the technology applied at present, the mouth part and adjacent neck parts consist of unoriented material, that is to say amorphous material. This means that the material in the mouth part including the adjacent neck parts has properties which differ from those of the container body. In containers of, for example, PET, the material in the mouth part has a glass transition temperature $T_g$ of 71° C., whilst the glass transition temperature of the material in the container is about 81° C. It follows from this that the material in the mouth part softens at a lower temperature than the material in the container body.

It is already known, by cold-forming of the mouth part of the blank, to displace material downwards from the mouth part into the sections of the blank, which later represent the wall sections of the container body. In this way, a certain matching of the quantity of material in the mouth part to the future stresses is achieved but, between the actual container body and the mouth part, neck sections are formed in which the material is stretched by a factor of less than 3. These neck sections in the moulded container thus consist of inadequately oriented material, whilst at the same time the wall thickness is undesirably large. This method is known from Swedish patent application No. 78/02,362-9.

French patent application No. 74/39,648 has disclosed a method wherein a tubular blank, which is closed at one end and which is provided at the other end with beading for fixing the blank in a downstream blowing element, is injection-moulded and wherein the tubular blank is blow-moulded after a certain reshaping to give a container. Material in the tubular part of the blank is expanded in the radial direction at a temperature above the glass transition temperature $T_g$ in order thus to form the mouth part of the container. A container formed in the manner described possesses a mouth part and a neck section in which the material has been exposed to only very slight stretching and hence orienting, so that the disadvantages, already indicated, with respect to the mouth parts of the known containers are also present in this container. The invention described in the French Application also has the disadvantage that only a part of the material content of the injection-moulded tubular blank is utilized when reshaping the blank to give the finished container. It is obvious that the losses of material, which occur in this process, represent an economic disadvantage in the mass production of articles.

From Federal German Offenlegungsschrift DOS No. 2,540,930, a process is known wherein a tubular blank of PET is reshaped to give a container and wherein the container wall consists of a material which is stretched by a factor of, for example, more than 1.5. The bottom part of the container consists of an amorphous unoriented material, whilst the neck sections of the container consist of material which has been oriented only to a slight extent. As a result of heating and crystallization, caused thereby, the strength of the material is improved in the unoriented zones which at the same time become opaque. Furthermore, a combination of the methods indicated above results in an undesired oversizing of the neck sections of the containers, whilst the latter at the same time have poorer properties than the material in the actual container body.

SUMMARY OF THE INVENTION

The invention provides a method for the manufacture of a blank which makes it possible that, in a container formed from the blank, both the mouth part and the neck sections and also the container body consist of a material which is adapted to the occurring stresses and in which the material in the said parts is oriented to a satisfactory extent in such a way that the material is stretched, at least in the axial direction, by a factor of more than 3.

This results in the advantage of a raised glass transition temperature $T_g$ in all the said parts of the container. This means that all the said parts will have the same heat resistance, and this is a great advantage compared with containers which are formed according to the known technology and which, at least as far as containers with mainly clear and transparent materials are concerned, have neck sections and mouth parts which are more sensitive to heat stresses than the actual container body.

Moreover, the invention enables a container of smaller mouth diameter to be manufactured, the length and diameter of the container body being matched to the storage capacity of the container in such a way that the smallest possible quantity of material per unit volume of storage space results.

In addition, the invention enables a container of any desired shape of the neck part to be formed from the blank, the container material in the mouth part and in the neck part also being oriented and having a crystallinity of more than 10%; this was achieved by stretching the material to the requisite extent, for example in the case of containers of PET by stretching in the axial direction by a factor of more than 3. According to known technology it was hitherto not possible to obtain such a degree of orienting, unless the mouth part and neck sections of the containers were to consist of mainly unoriented material, in which case the neck sections merge in the shortest possible distance with oriented sections of the container body, where the wall thickness has been reduced by a factor of at least 3. This shaping represented an attempt to reduce the size of that zone in the neck part, which has mainly amorphous material and low orientation and hence a lower glass transition temperature Tg.

According to the invention, a number of zones in a tube of PET or a comparable material is oriented in such a way that material in the particular zone is gradually caused to flow by means of external pressure and the pressure-generating element at the same time reduces the thickness of the material to about $\frac{1}{3}$, preferably at most $\frac{1}{3}$, of the previous thickness, the reduction in thickness entailing an elongation of the material zone being worked by a factor of about 3, preferably a factor of at least 3, in the axial direction of the tube. Before flowing, the material is at a temperature which is below the glass transition temperature Tg and preferably at room temperature. The external pressure is generated, for example, by one or several rollers which roll over the outer or inner surface of the tube and which shift in the axial direction of the tube. After working, the material is oriented in the axial direction of the tube.

The zones of reduced wall thickness are as a rule found in those parts of the tube which, in the future blow-moulded container, correspond to the material zones, the material thickness of which would be greater than about 1/9 of the material thickness of the tube, if the material thickness of the tube in the zone concerned had not already been reduced before blow-moulding. In certain applications, the wall thickness is reduced in all zones of the tube as a result of pressure against the outer surface of the tube and, in other applications, the reduction is effected in all zones as a result of pressure against the inner surface of the tube. Moreover, embodiments are used wherein the wall thicknesses of a number of zones are reduced as a result of pressure against the inner surface and, simultaneously, the wall thicknesses of a number of other zones are reduced as a result of pressure against the outer surface of the tube. Furthermore, embodiments are used wherein the wall thickness in a number of zones is reduced by simultaneous pressure in each zone against the inner and outer surfaces of the tube.

In a preferred embodiment of the invention, one of the oriented zones in the tube is located at one end of the tube. The material in this zone is then blow-moulded at a temperature above the glass transition temperature Tg against a mould in order to form, for example, a thread with, in the present case, parts of adjacent neck sections in a future mouth part. Subsequently, the tube is reshaped at the opposite end in such a way that it is closed, whilst the future mouth part is treated in the present case in such a way that the requisite closure surfaces are obtained.

The first holder is connected to a drive mechanism which rotates the holder and thus also the tube. One of the holders is designed in such a way that it enables the tube to be elongated in the axial direction, in conjunction with the reduction in thickness of the wall material in the zone being worked.

Moreover, the arrangement is provided with heating elements which, after the pressure treatment, heats the oriented material to a temperature above the glass transition temperature Tg. Radiant energy is preferably used for heating, the first holder rotating the tube about the axis of the tube in order to make the temperature in the oriented material as uniform as possible, before the latter is blow-moulded.

The arrangement also comprises an element for closing the two ends of the tube before blow-moulding, and an element for pressurizing the closed cavity formed in this way. Finally, an element for severing the blow-moulded tube into two preferably equal parts is provided. Each of the two blank parts is then closed at one end by reshaping according to a known method, and in cases which may occur, the mouth edge of the opposite end is reworked, for example by a warm shaping element, in order to provide the required closure surfaces.

The pressure-generating element is provided with one or several forming rollers. In the embodiment with several forming rollers, the latter are arranged at a slight offset in the axial direction relative to one another. In a preferred embodiment, each forming roller has, as viewed in the axial direction of the roller, a central press surface and, on both sides thereof, a holding surface. The difference in diameter is twice the reduction in thickness, which is obtained on orienting of the material. The transition surfaces between the press surface and holding surfaces preferably form an angle of about 45° with respect to the roller axis in the case of PET. The said angle is adjusted to the slope which results on cold-forming of the material between the amorphous material and the drawn material.

BRIEF DESCRIPTION OF THE DRAWING

The invention will be described in more detail by reference to a number of illustrations in which FIGS. 1-2 show pressure-forming equipment in different working positions, FIG. 3 shows different phases of the pressure-forming step.

DETAILED DESCRIPTION

Figures 1A, 1B:
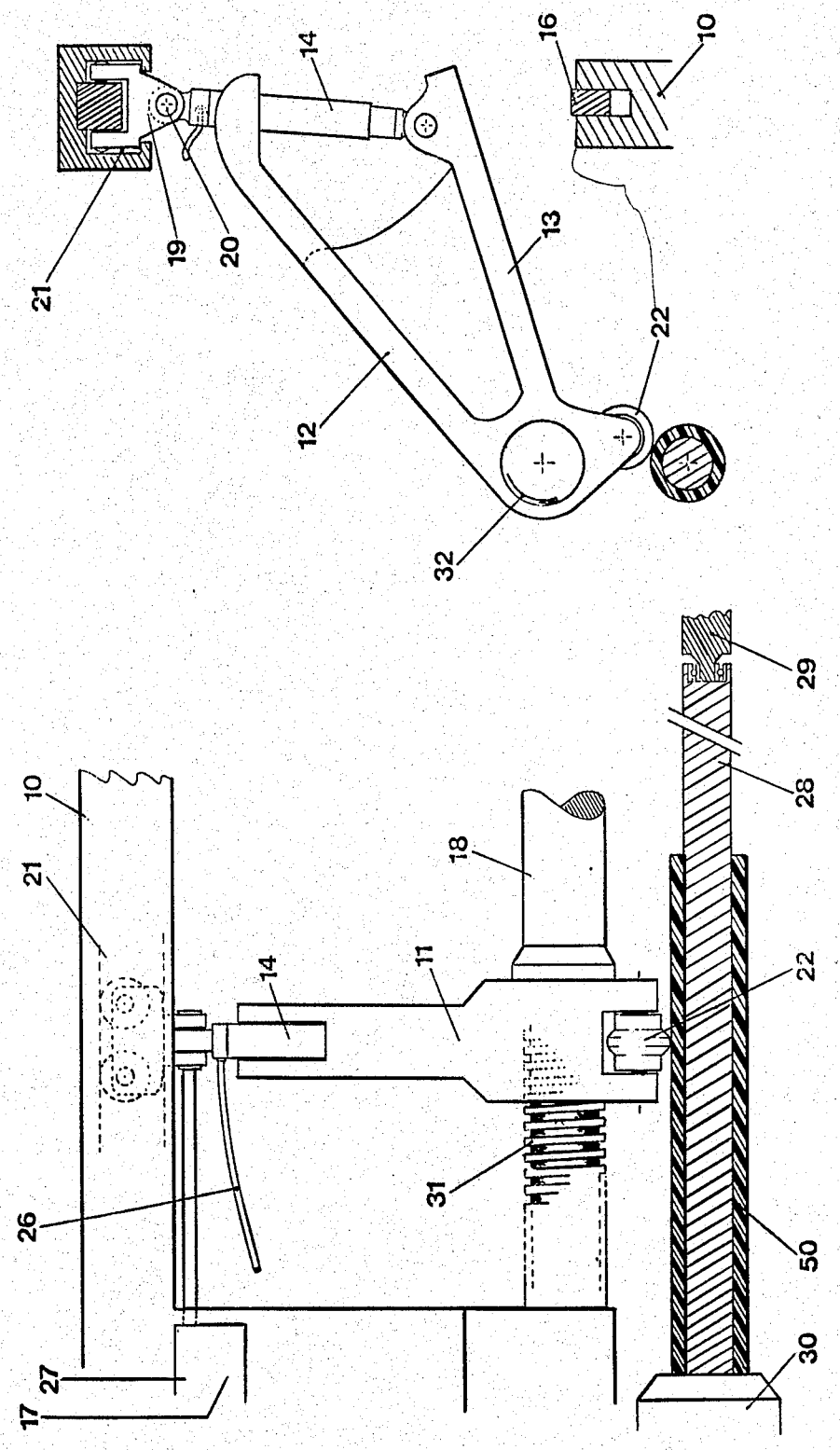

In FIGS. 1 and 2, equipment for the pressure-forming of a tube from a thermoplastic material is shown. FIGS. 1a and 2a show the equipment in front view and FIGS. 1b and 2b show the equipment in side view, respectively. In FIG. 1, the equipment is in the starting position and, in FIG. 2, it is in the working position.

FIGS. 1 and 2 show a frame 10 on which a holder 11 is arranged in such a way that it can describe a reciprocating motion on a track 21. The holder consists of an upper holder arm 12 and a lower holder arm 13, which are movably connected to a pressure cylinder 14. The upper end of the pressure cylinder 14 is fastened via a bearing 20 to a car 19 which runs on the track 21. A line 26 for pressure medium is connected to the pressure cylinder 14. A sensor 16 is actuated by the lower holder arm 13 and indicates that the holder 11 is in the working position. The sensors 17 and 27 indicate the two end positions for the reciprocating movement of the holder 11.

A feed shaft 18 is driven by a drive mechanism, which is not shown, and is guided by means of an orifice 32, provided with an internal thread, in the holder 11. The feed shaft 18 has an external thread 31 corresponding to the internal thread 32 and, furthermore, it is mounted in the frame 10 on the side opposite the drive. A forming roller 22 is mounted in a bearing in the holder 11.

A tube 50 which is fixed by a fixing element 30 and which is rotated by a drive mechanism which is not shown can also be seen in the figures.

Using this equipment, the tubular blank is produced. In its simplest embodiment, it consists partially of a cylindrical part which is closed at one end and consists mainly of amorphous material, and partially of a future mouth part with adjoining future neck sections, consisting of oriented material having a crystallinity of more than 10%. The material in the future mouth part with the adjoining future neck sections has pronounced orientation in the axial direction of the tube and a normally smaller orientation in the circumferential direction of the tube. The last-mentioned orientation, which was produced during the radial expansion of the material, thus depends on the extent of this radial expansion.

If more than one oriented zone is present, the material properties indicated above apply of course to all the oriented zones.

According to an embodiment of the invention, a central zone of the tube is worked in order to obtain the abovementioned orientation of the material. This zone with oriented material is surrounded, in the axial direction of the tube, by two tube parts of amorphous material. When the material being worked, which is oriented mainly axially, is blow-moulded, mouth parts and neck sections for two blank parts are formed, the mouth parts of which point towards one another. In the transition between the two mouth parts, the tube is severed, two blank parts formed which, after closing and, if appropriate, reworking of the mouth edges in order to obtain the required closing surfaces, represent pre-mouldings for subsequent shaping to give containers.

The embodiment of the invention, described in the preceding paragraph, makes it possible to set up production equipment which works efficiently.

In equipment for the manufacture of preforms or pre-mouldings according to the invention, a tube of PET or comparable material is clamped between two holders. The first holder fixes the tube adjacent to one tube end, whilst the second holder serves as a support for the tube and enables the tube to rotate about its own axis. Alternatively, the second holder serves simultaneously as the working element, that is to say the pressure-generating element which effects the flow of the material, indicated above.

To stabilize the position of the tube 50, an inner support cylinder 28 forming a shaft is provided, and this is likewise fixed by the fixing element 30. The opposite end of the support cylinder is rotatably mounted in a bearing 29. The length of the inner support cylinder 28 is selected such that it is possible to elongate the tube 50.

FIGS. 3a–d show the design of the forming roller 22 in more detail. The forming roller has a central press surface 23 and two holder surfaces 24a–b on both sides of the press surface, as seen in the axial direction of the roller. The diameter of the holder surfaces is smaller than that of the press surface, the difference in diameter being twice the displacement of the tube 50 in the axial direction, to which the roller is subjected in moving from the position shown in FIG. 3a to the position shown in FIG. 3b. Between the press surface and the two holder surfaces, transition surfaces 33a and 33b can be seen which are arranged to be at an oblique angle to the axial direction of the roller. The angle is adjusted to the inclination of the transition which is produced on cold-forming in the flow zone of the material.

FIG. 3a shows an untreated tube 50, the roller 22 being in contact with the outer surface of the tube. FIGS. 3b–c show the tube 50b or 50c during different phases of the working step, and FIG. 3d shows the tube 50d after the end of the working step. In the figures, the distances x, y, z and 3x, 3y, 3z respectively are indicated, wherein x, y, z denote the feed of the roller in the axial direction of the tube and 3x, 3y, 3z denote the lengths, corresponding thereto, of the worked zone. The elongation of the tube during working is thus of the order of magnitude of 2z. The reference numeral 51 marks a worked part of the tube.

Figure 4:
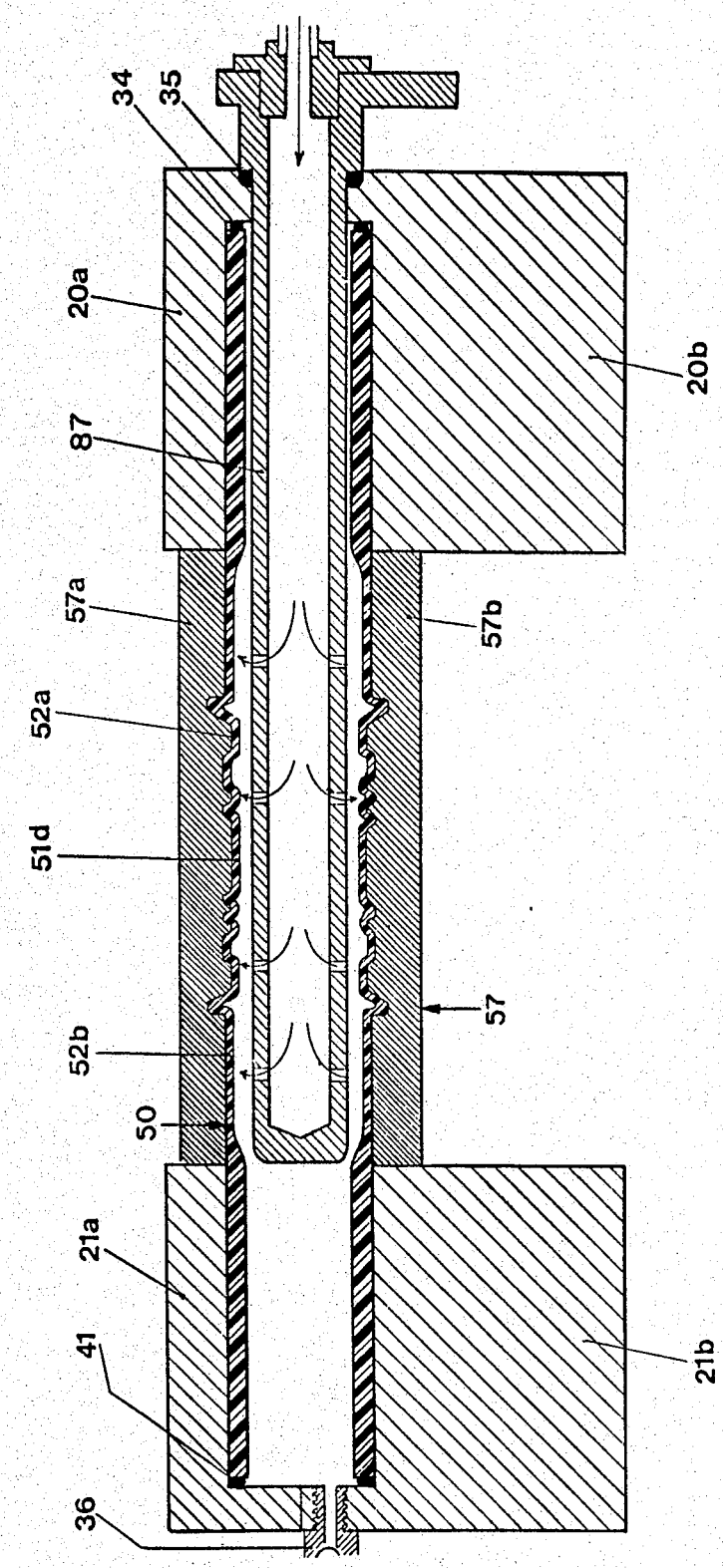
FIGS. 4-5 show alternative embodiments of equipment and blow-moulds for moulding mouth parts and adjacent neck sections.

FIG. 4 shows equipment for reshaping the worked part 51d of the tube 50d by blow-moulding. The equipment consists of the holders 20a–b, 21a–b, which fix the two ends of the tube. The end faces of the tube bear against gaskets 34, 41. One of the two holders 21a–b is provided with an outlet valve 36. Between the holders 20, 21, a mould 57a–b is located, the moulding surface of which corresponds to the desired shape of the tube after the blow-moulding of the worked part 51d of the tube. The reference numerals 52a and 52b denote two mouth parts, pointing towards one another, of the radially expanded tube 50. A blowing mandrel 87 with orifices 40 is provided for supplying pressure medium to the closed cavity which is formed in the interior of the tube 50 with the aid of the gaskets 34, 41. A gasket 35 is located between the blowing mandrel and the holders 20a–b in order to seal the mandrel against the holders.

Figure 5:
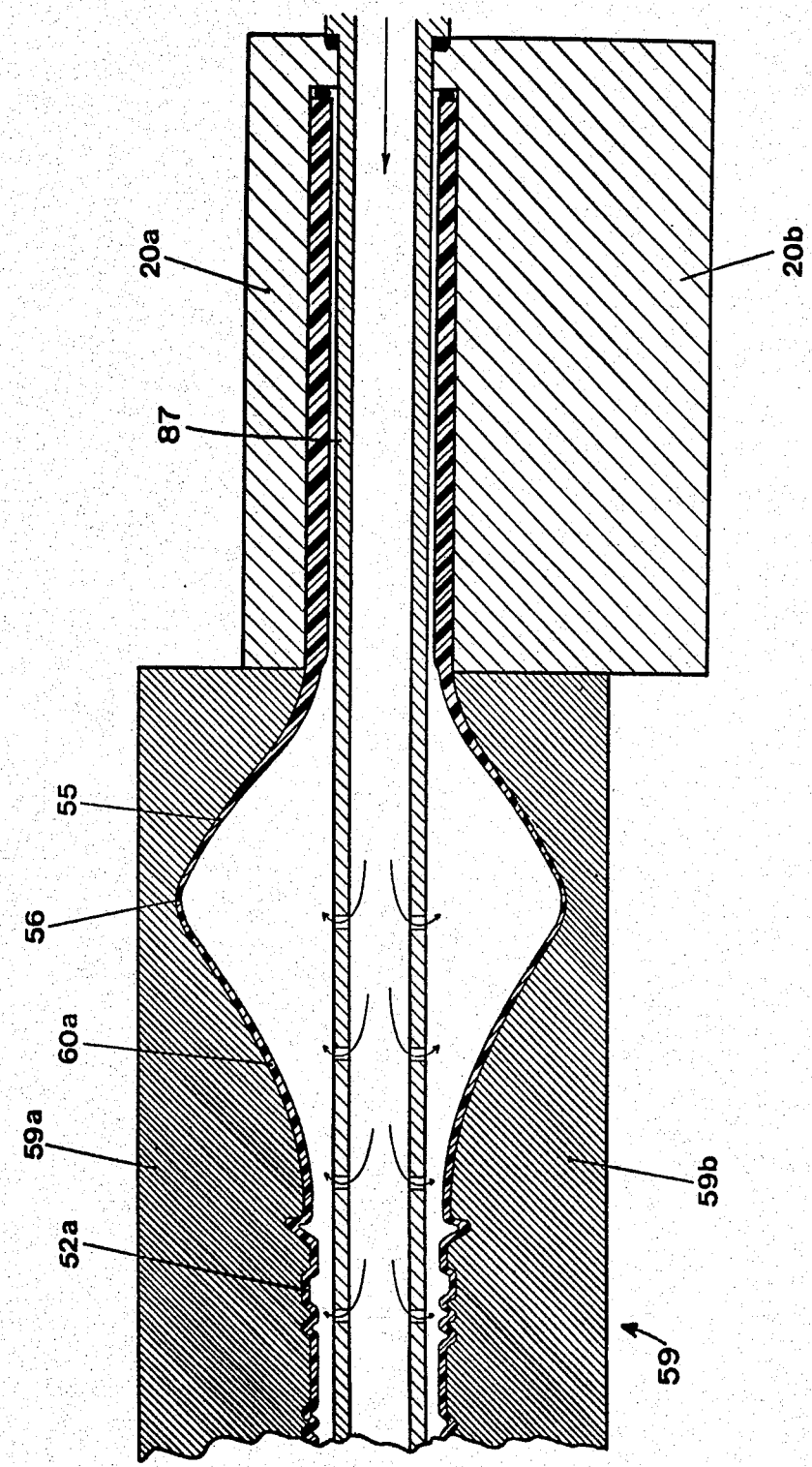

FIG. 5 shows a further embodiment of equipment for reshaping the worked part 51d of the tube, this equipment being identical in principle with that shown in FIG. 4. In FIG. 5, however, only one of the two holders 20a–b and only one part of the mould 59, corresponding to mould 57 in FIG. 4, are shown. The figure also shows the central worked zone which is blown against the mould 59. The surfaces surrounding the mould 59 match the shape of two mouth parts, which point towards one another (and of which only one, 52a, is shown in the figure) and of parts of the adjacent future neck section 60a of the container which is to be formed from the blanks being in the process of production. A zone 56 with the largest diameter of the moulded future neck sections preferably has a diameter which is at least three times the original diameter of the tube.

Figure 6:
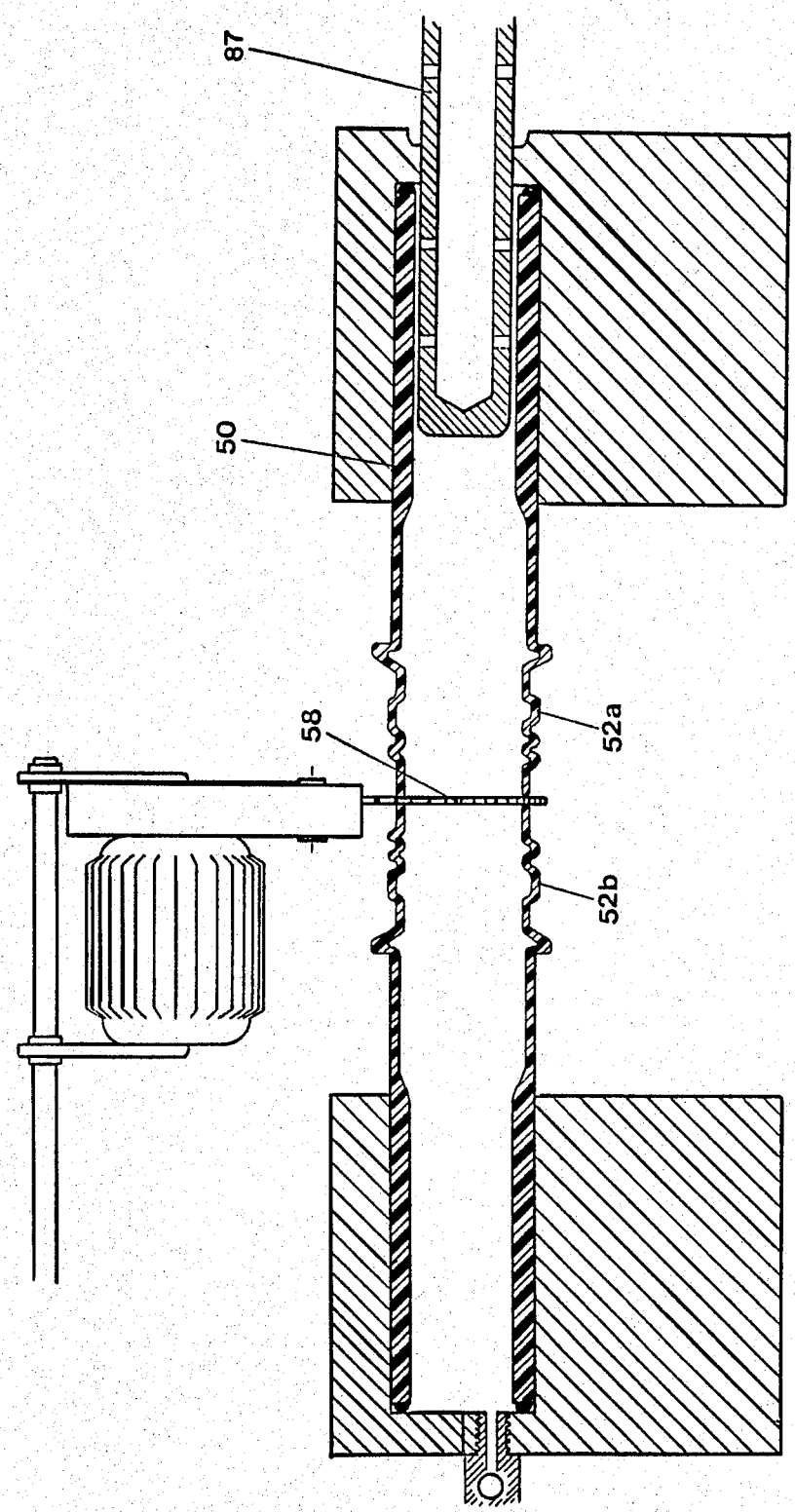
FIG. 6 shows equipment for severing the tube formed by blow-moulding and FIGS. 7-8 show alternative embodiments of pre-mouldings according to the invention.

FIG. 6 shows equipment for severing the tube formed by blow-moulding. According to the figure, a severing device 58 severs the blow-moulded tube 50 at the transition between the two mouth parts 52a–b which have been formed.

Figure 7:
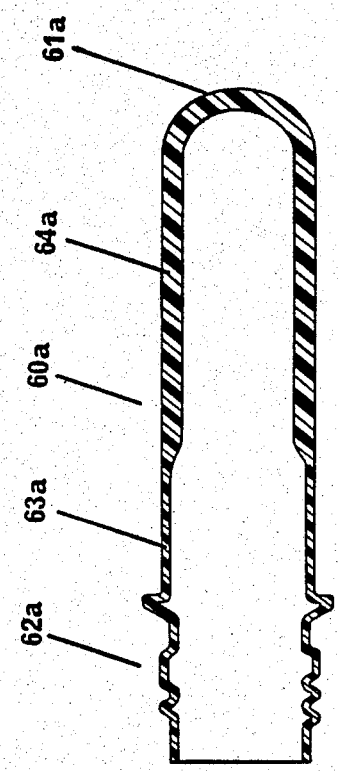
Figure 8:
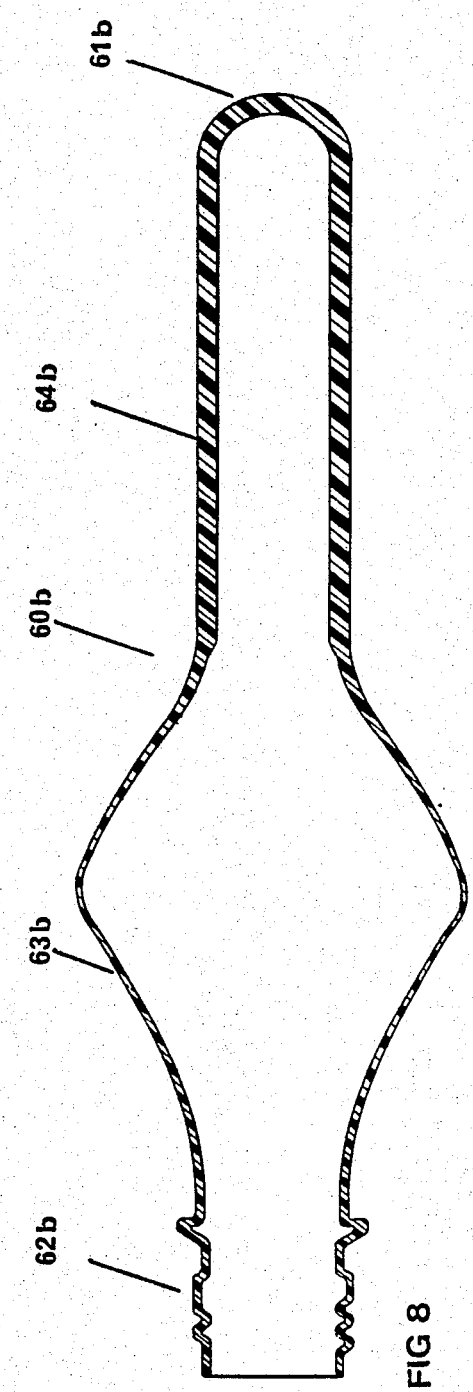

FIGS. 7–8 show completed tubular preforms or pre-mouldings 60, the pre-moulding 60a according to FIG. 7 having been formed from a blank part according to FIG. 4 and the pre-moulding 60b according to FIG. 8 having been formed from a blank part according to FIG. 5. At one end in each case, the pre-mouldings have a mouth part 62a, 62b with adjacent neck sections 63a, 63b. At the particular other end the pre-mouldings have a closure 61a, 61b. A tubular section 64a, 64b can be seen between the closures 61a, 61b and the neck sections 63a, 63b.

In pressure-forming of a tube 50, the latter is fixed in the fixing element 30. It thus surrounds the inner support cylinder 28. Pressure is applied to the pressure cylinder 14 so that it displaces the holder 11 in such a way that the lower holder arm 13 is moved in the direction of the sensor 16. The roller 22 is thus displaced in the axial direction relative to the tube 50 and, in a first phase, the roller assumes the position shown in FIG. 1. At the same time as pressure is applied to the pressure cylinder 14, the drive mechanisms for the fixing element 30 start to run, the tube 50 being rotated about its axis.

Subsequently, the pressure cylinder 14 further displaces the holder 11 until the lower holder arm 13 bears against the sensor 16 and the holder assumes the position shown in FIG. 2. The displacement of the holder 11 has the effect that the roller 22 assumes its other position, that is to say the working position. Material in the wall of the tube 50 is thus displaced. In an initial phase of this feeding process, the wall is deformed purely elastically but, in the state of highest pressure, flow in the material sets in and the resulting deformation is permanent and corresponds to a reduction in the wall thickness to about ⅓ of the original thickness.

As already stated, the sensor 16 indicates that the roller is in the working position. The sensor 16 causes the drive mechanisms for the feed shaft 18 to start so that the latter is set in rotary motion. During this rotary motion, the holder 11 is displaced due to the threads of the feed shaft 18 and orifice 32, until the holder 11 abuts against the sensor 17. At the same time, this causes the rotary motion of the fixing element 30 to be switched off and the pressure cylinder 14 to be retracted so that the holder assumes a position corresponding to that shown in FIG. 1. The shaped tube can then be taken out of the forming device.

FIGS. 3a–d show the reshaping of the tube 50 in principle. FIG. 3a corresponds to the position according to FIG. 1, FIGS. 3b–c illustrate the course of the reshaping step and FIG. 3d shows the position corresponding to FIG. 2. Due to the reduction in wall thickness, the tube is elongated in its axial direction. The total feed z of the roller in the axial direction of the tube results in a worked part 51d of length 3z, and this means that the tube has been elongated by the length 2z during the working.

FIG. 3b shows how the transition face 33b of the roller is in contact with the material in the flow zone, whilst at the same time the holding surface 24b eliminates any tendencies to form corrugations in the material, adjoining the flow zone.

It was assumed in the above description that the holder 11 and the roller 12 are displaced from right to left in the figures, that is to say in the direction of elongation of the tube. Alternatively, the forming process can take place in the opposite direction. Advantageously, the equipment is designed in such a way that every second tube is formed alternately by feeding the roller against the direction of elongation of the tube and in the direction of elongation of the tube. For this purpose, the sensor 27 is provided which indicates that the holder 11 has, during the motion of the direction of elongation of the tube, assumed the position which represented the starting position when the tube was fed in the direction of elongation. During feeding in the direction of elongation of the tube, the speed of rotation of the feed shaft 18 is about 3 times the speed of rotation when being fed in the opposite direction.

During blow-moulding of the worked tube, the tube is fixed at the holders 20a, b and 21a, b, whereupon the blowing mandrel 87 is introduced into the tube, and sealed at seal 35. The outlet valve 36 is closed at this stage. The worked zone 51d of the tube is heated by conventional devices, whereupon the mould 57 is closed. To accelerate heating of the material, it is also possible to provide the mandrel 87 with heating means. The closed space in the interior of the tube 50 is subjected to pressure, and the heated part of the tube is blow-moulded until it makes contact with the cold mould surface of the mould 57 or 59. When the material has cooled sufficiently to be dimensionally stable, the mould 57 or 59 is opened and a severing device 58 severs the blow-moulded tube into two blank parts at the transition between the two future mouth parts.

In the above description, it was shown how the blank parts are formed by severing the drawn and moulded tube. In a preferred embodiment of the invention, the blank parts are severed with the aid of one or more severing discs which rotate under pressure around the circumferential surface of the moulded tube at the transition between the two future mouth parts.

To obtain a pre-moulding according to one of the alternative embodiments shown in FIGS. 7–8 from the blank parts produced, that end of the particular blank part which has not been moulded is closed by reshaping. For this purpose, already known technology is used, according to which, for example, the material is heated to a temperature above the glass transition temperature Tg, whereupon the blank is pressed into a spherical shell which reshapes the heated material and closes the end of the tube.

With reference to the figures, equipment was illustrated above which contained only one forming roller. In certain illustrative embodiments, a number of forming rollers or pressure-generating elements are used. Particular advantages are here obtained in an illustrative embodiment having three pressure-generating elements which are arranged in the corners of an equilateral triangle.

Heat is always generated during the reshaping of the tube by the pressure-generating elements (forming rollers). In certain applications, the pressure-generating elements are therefore cooled in order to ensure that their contact surfaces are always below the glass transition temperature of the material of the tube. In particular when pressure-generating elements of relatively small dimensions are used, the temperature rise can assume such values that cooling is necessary.

In addition to the above description, the invention is also comprised by the attached patent claims.

What is claimed is:

1. A method of producing a tubular pre-molding of a thermoplastic material, the pre-molding comprising a mouth part with adjacent neck section at one end and a tubular section continuing from the neck section, said method comprising providing a tubular blank consisting mainly of orientable material, orienting the mouth part and adjacent neck section of the blank to form said pre-molding by reducing the thickness of the material while retaining the original thickness of the remainder of the blank such that at least said mouth part has a lower degree of orientation in the circumferential direction as compared to the axial direction, and providing an increased glass transition temperature Tg in said mouth part and adjacent neck section by the reduction of the thickness and the orientation of the mouth part and adjacent neck section such that the increased glass transition temperature Tg in said mouth part and neck section is substantially equal to the glass transition temperature of said tubular section when orientable material of the tubular section is oriented by a subsequent blowing of the pre-molding to a container.

2. A method as claimed in claim 1 wherein the orientable material of the blank is substantially amorphous with a crystallinity of less than 5%.

3. A method as claimed in claim 1 wherein the material of the blank is at a temperature below the glass transition temperatures in said mouth part and adjacent neck region at the commencement of reducing the thickness thereof.

4. A method as claimed in claim 1 comprising radially expanding the axially oriented material of the mouth part and adjacent neck section after heating said material to a temperature above the glass transition temperature.

5. A method as claimed in claim 1 wherein said thermoplastic material is selected from the group consisting of polyethylene terephthalate, polyhexamethylene adipamide, polycaprolactam, polyhexamethylene sebacamide, polyethylene 2,6- and 1,5-naphthalate, polytetramethylene 1,2-dihydroxybenzoate and copolymers of ethylene terephthalate and ethylene isophthalate.

6. A method as claimed in claim 1 wherein said thermoplastic material is polyethylene terephthalate and is reduced in thickness by at least about 3 while concurrently being stretched axially.

7. A method as claimed in claim 1 wherein the orientation of the mouth part and adjacent neck section obtained by reduction of thickness provides a crystallinity of between 10 and 20%.

8. In a method of producing a container from a tubular pre-molding of a thermoplastic material, the pre-molding having a mouth part with adjacent neck section at one end and a tubular section continuing from the neck section, the improvement comprising providing a tubular blank consisting mainly of orientable material, orienting the mouth part and adjacent neck section of the blank to form said pre-moulding by reducing the thickness of the material while retaining the original thickness of the remainder of the blank such that at least said mouth part has a lower degree of orientation in the circumferential direction as compared to the axial direction, providing an increased glass transition temperature Tg in said mouth part and adjacent neck section by the reduction of the thickness and the orientation of the mouth part and adjacent neck section, and thereafter blowing orientable material of the tubular section of the pre-molding to orient the material of the tubular section and form the container such that the increased glass transition temperature Tg in said mouth part and neck section is substantially equal to the glass transition temperature of the oriented material of the container formed from said tubular section.

9. The improvement as claimed in claim 8 wherein the orientable material of the blank is substantially amorphous with a crystallinity of less than 5%.

10. The improvement as claimed in claim 8 wherein the material of the blank is at a temperature below the glass transition temperatures in said mouth part and adjacent neck region at the commencement of reducing the thickness thereof.

11. The improvement as claimed in claim 8 comprising radially expanding the oriented material of the mouth part and adjacent neck section after heating said material to a temperature above the glass transition temperature.

12. The improvement as claimed in claim 8 wherein said thermoplastic material is selected from the group consisting of polyethylene terephthalate, polyhexamethylene adipamide, polycaprolactam, polyhexamethylene sebacamide, polyethylene 2,6- and 1,5-naphthalate, polyetremethylene 1,2-dihydroxybenzoate and copolymers of ethylene terephthalate and ethylene isophthalate.

13. The improvement as claimed in claim 8 wherein said thermoplastic material is polyethylene terephthalate and is reduced in thickness a factor of at least about 3 while concurrently being stretched axially.

14. A method as claimed in claim 8 wherein the orientation of the mouth part and adjacent neck section obtained by reduction of thickness provides a crystallinity of between 10 and 20%.

* * * * *